(12) United States Patent
Princell

(10) Patent No.: US 6,505,488 B1
(45) Date of Patent: Jan. 14, 2003

(54) SPARE TIRE LOCK

(76) Inventor: William E. Princell, 7875 Clearwater Cove Dr., Indianapolis, IN (US) 46240

( * ) Notice: Subject to any disclaimer, the term of this patent is extended or adjusted under 35 U.S.C. 154(b) by 0 days.

(21) Appl. No.: 09/296,982

(22) Filed: Apr. 22, 1999

(51) Int. Cl.[7] .............................................. E05B 65/12
(52) U.S. Cl. ................................ 70/259; 70/14; 70/55; 224/42.23
(58) Field of Search ....................... 70/259, 260, 54–56, 70/14, 225, 226; 224/42.12, 42.23, 42.24

(56) References Cited

U.S. PATENT DOCUMENTS

| | | | |
|---|---|---|---|
| 3,431,756 A | | 3/1969 | Fennell .......................... 70/259 |
| 3,865,264 A | | 2/1975 | Kuhns .................. 224/42.23 X |
| 3,940,959 A | | 3/1976 | Anderson et al. ............. 70/259 |
| 4,282,995 A | * | 8/1981 | Austin ....................... 70/259 X |
| 4,308,733 A | * | 1/1982 | Tampa .......................... 70/259 |
| 4,622,833 A | * | 11/1986 | Shepard ........................ 70/226 |
| 4,683,737 A | * | 8/1987 | Armstrong .................... 70/253 |
| 4,765,164 A | | 8/1988 | Prince, Jr. ..................... 70/259 |
| 4,768,361 A | | 9/1988 | Derman ........................ 70/259 |
| 4,794,771 A | | 1/1989 | Princell ........................ 70/259 |
| 4,844,498 A | * | 7/1989 | Kerins et al. ................ 280/504 |
| 5,211,043 A | * | 5/1993 | Langdon ....................... 70/259 |
| 5,426,963 A | * | 6/1995 | Tafoya ......................... 70/259 |
| 5,487,288 A | | 1/1996 | Frantz .......................... 70/259 |
| 5,638,710 A | | 6/1997 | Howard, Jr. et al. .......... 70/259 |
| 5,836,182 A | * | 11/1998 | Schotthoefer ................ 70/259 |
| 5,992,193 A | * | 11/1999 | Bronk, III ................. 70/258 X |

* cited by examiner

Primary Examiner—Suzanne Dino Barrett
(74) Attorney, Agent, or Firm—Woodard, Emhardt, Naughton, Moriarty & McNett LLP

(57) ABSTRACT

A tire lock mounts to an opening in the vehicle frame in order to suspend a locking bar down through an opening in the spare wheel. A locking device may then be slid over the distal end of the locking bar in order to lock the spare wheel securely in place. The locking device is designed to accept a lock cylinder from the manufacturer's easily-defeated spare tire lock, so that the locking device of the present invention may be keyed with the remaining locks of the vehicle. The locking mechanism of the present invention also incorporates a spring-loaded resilient boot which engages the vehicle spare wheel lug nut hole, thereby preventing annoying rattling between the spare tire lock of the present invention and the spare tire.

17 Claims, 14 Drawing Sheets

SPARE TIRE LOCK

TECHNICAL FIELD OF THE INVENTION

The present invention generally relates to locks and, more particularly, to locks used to prevent the theft of a vehicle spare tire.

BACKGROUND OF THE INVENTION

The spare wheel and tire for a vehicle normally exhibits a high replacement cost. This is particularly true for vehicles such as pick-up trucks and sport utility vehicles, which typically must carry a full-size spare wheel and tire. Unfortunately, theft of such valuable spare tires is a pervasive problem, especially for vehicles such as pick-up trucks and SUVs, which often mount the spare wheel and tire below the vehicle frame, suspended by a winch-driven cable. For example, it is not uncommon for franchised new truck dealers to have many spare tires stolen from the trucks while they are stored or displayed on the dealer's lot. Private owners of these vehicles also experience similar problems.

Because of these theft concerns, it is desirable to provide a means for locking the spare tire (and the corresponding wheel) to the vehicle in order to prevent theft. It is particularly desirable to provide a device which can be added to the already manufactured vehicle without modification to the vehicle.

Various devices have been developed in the past to lock an under-frame mounted spare tire to the vehicle. For example, my previous patent, U.S. Pat. No. 4,794,771, comprises a bar which is suspended from the metal spare tire winch tube and extends through the spare wheel. A lock is fastened to the end of the bar in order to securely lock the wheel to the vehicle. The which tube in this previous design is a solid metal tube that is rotated to operate the winch, and therefore is structurally solid enough to support the spare tire lock bar. This design has proven to be an exemplary protection device for many vehicle designs, however, some manufacturers of vehicles such as pick-up trucks are now employing a plastic winch tube on the vehicles which limits the usefulness of my prior art design, because this plastic winch tube only serves to guide the winch rotation tool to the winch and is not structurally suited to support the spare tire lock bar.

With reference to FIG. 1, there is shown a prior art spare tire winch mechanism, such as those currently found on many pick-up trucks, as viewed from the underside of the vehicle. The prior art winch assembly is generally indicated at 10. The winch assembly 10 includes a winch mechanism 12 mounted to the underside of the vehicle frame 14 by means of a bolt-on bracket 16. A cable 18 extends from the bottom surface of the winch 12 and is attached to the spare wheel/tire (not shown) in order to raise and lower same from underneath the vehicle. Extension and retraction of the cable 18 is accomplished by rotation of the square post 20.

In order to provide convenient access to the square post 20 from the rear of the vehicle, a plastic winch tube 22 covers the square post 20 and extends to the rear of the vehicle through an opening in the vehicle bumper (not shown). This allows an elongated tool to be inserted into the winch tube 22 from the rear of the vehicle, such that the tool engages the square post 20, whereupon the tool may be rotated in order to raise and lower the winch cable 18 (and hence the spare wheel/tire). In order to prevent unauthorized access to the winch 12, the vehicle manufacturer provides a lock cylinder 24 which lockingly engages the open end of the winch tube 22 at the rear bumper, thereby preventing access to the square post 20 until the lock cylinder 24 is unlocked and removed from the winch tube 22.

This prior art security means provided by the manufacturer has proven to be relatively ineffective because it can be defeated by a thief in many different ways. For example, six different ways to easily defeat the prior art factory-installed winch mechanism lock are illustrated in FIGS. 2A–F. FIG. 2A illustrates the rear bumper of the vehicle, where access is provided to the lock cylinder 24 at the end of the winch tube 22. A screwdriver 26 or small pry bar may be placed under the flange edge of the plastic lock housing which forms the proximal end of the winch tube 22. This flange edge will break away in several pieces when pried upon, allowing the lock housing to be pushed through the vehicle bumper. Reaching up behind the bumper will then allow the broken lock housing to be removed from the end of the winch tube 22 with the lock cylinder still locked inside. Access may then be had to the square post 20, which operates the winch 12.

As shown in FIG. 2B, there is a small raised cavity 28 on the lower side of the plastic lock housing just behind the rear bumper. Using an ice pick held with the pointed end angled slightly to the rear of the vehicle, a small hole may be made in the bottom of the cavity 28. Pushing the end of the ice pick in through the hole will depress the spring-loaded lock bolt, releasing the lock cylinder from the end of the lock housing. Access may then be had to the square shaft 20, which operates the winch 12.

Referring to FIG. 2C, a pair of pliers 30 may be clamped around the plastic winch tube 22 from the backside of the rear vehicle bumper, and rotated. Such an attempt to turn the lock housing in its square mounting hole will crack and break the edge of the steel retainer ring, which holds it in place. Pulling down on what remains of the broken lock housing will release the lock cylinder from the part of the lock housing which is still installed in the rear vehicle bumper. Access may then be had to the square shaft 20 which operates the winch 12.

Referring to FIG. 2D, the plastic winch tube 22 may be reached above the spare tire from the right side of the vehicle. Grasping the winch tube 22 and pulling downward sharply will release the winch tube 22 from its mounting location over the square shaft 20. The square shaft 20 can now be accessed through the large rectangular hole in the center of the rear bumper.

Referring to FIG. 2E, only one mounting bolt 32 attaches the winch 12 to the vehicle frame. A new spare wheel design with large center hub openings allows easy access to the mounting bolt 32. Removing this bolt 32 releases the winch mechanism 12 from the frame 14, with the spare tire still attached.

Referring to FIG. 2F, a quick and easy way to defeat most spare tire locks is to simply cut the winch cable 18 above the spare wheel. The new wheel design with larger center hub openings now allows unrestricted access to cut the winch cable 18.

It can be seen from the above examples that there are numerous ways to easily defeat the factory supplied spare tire lock system. There is therefore a need for an alternative spare wheel/tire lock design which cannot be defeated by any of these methods. The present invention is directed toward meeting this need.

SUMMARY OF THE INVENTION

The present invention relates to a spare tire lock which installs through an opening in the vehicle frame in order to suspend a locking bar down through an opening (preferably the lug nut hole) in the spare wheel. A locking device may then be slid over the distal end of the locking bar in order to lock the spare wheel securely in place. The locking device is designed to accept a lock cylinder from the manufacturer's easily-defeated spare tire lock, so that the locking device of the present invention may be keyed with the remaining locks of the vehicle. The locking mechanism of the present invention also incorporates a spring-loaded resilient boot which engages the vehicle spare wheel lug nut hole and eliminates excessive end play, thereby preventing annoying rattling between the spare tire lock of the present invention and the spare tire.

In one form of the invention, a spare tire lock for securing a spare wheel and tire suspended under a vehicle having a frame is disclosed, said spare tire lock comprising a lock bar having a proximal end and a distal end, the lock bar proximal end being coupled to said vehicle frame, wherein said lock bar extends through an opening in said spare wheel, such that the proximal and distal ends of said lock bar are on opposite sides of said spare wheel; and a locking mechanism releasably coupled to the distal end of said lock bar.

In another form of the invention, a method of locking spare wheel and tire suspended under a vehicle having a frame, a pre-existing winch for raising and lowering the spare wheel, and a pre-existing lock for locking the pre-existing winch, is disclosed comprising the steps of: a) providing a lock bar having a proximal end and a distal end; b) coupling the lock bar proximal end to the frame; c) removing a lock cylinder from the pre-existing lock; d) extending the distal end of the lock bar through an opening in the spare wheel, such that the proximal and distal ends of the lock bar are on opposite sides of the spare wheel; e) providing a locking mechanism housing having a cavity therein for accepting a locking device; f) inserting the lock cylinder from the pre-existing lock into the cavity in the locking mechanism housing; and g) lockingly coupling the locking mechanism to the distal end of the lock bar.

DETAILED DESCRIPTION OF THE PREFERRED EMBODIMENTS

Figure 1:
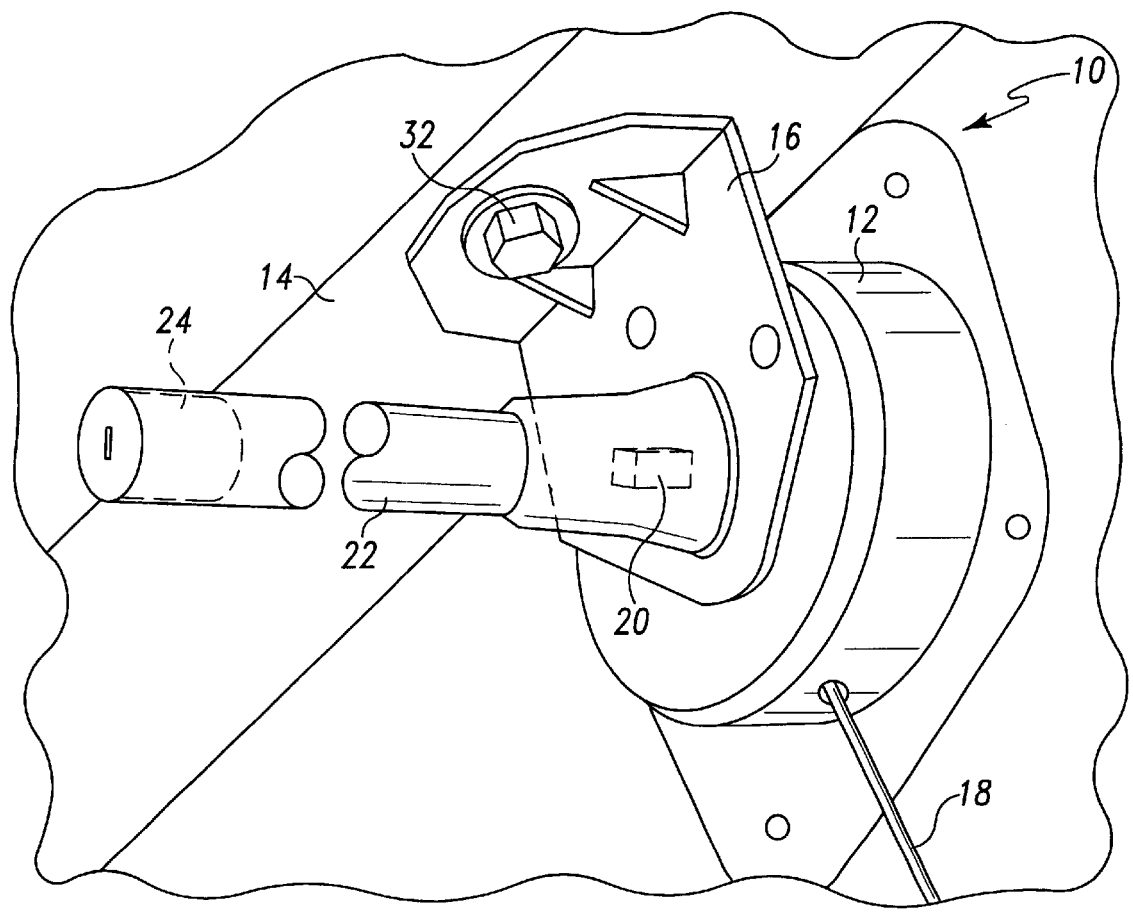
FIG. 1 is a schematic perspective view of a prior art spare tire locking mechanism supplied by a vehicle manufacturer.
Figure 2A:
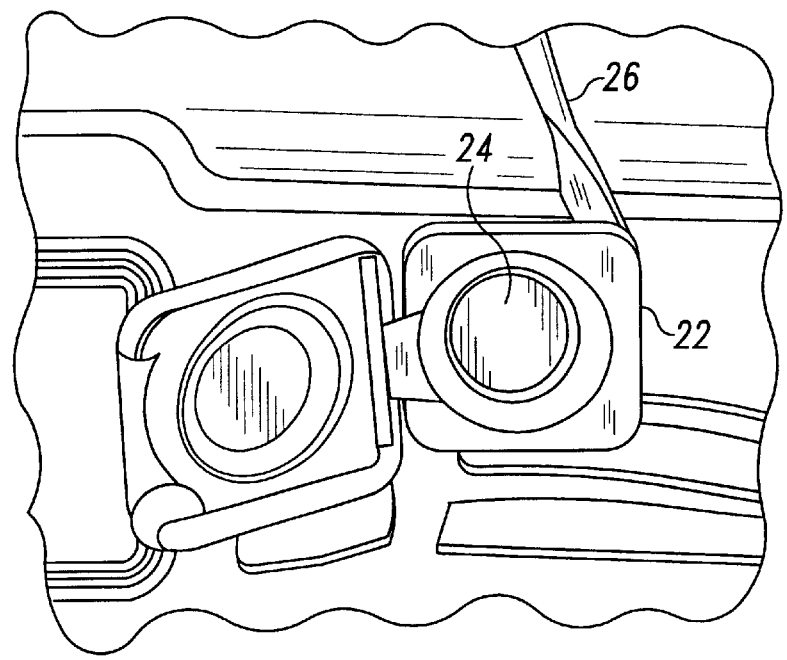
FIGS. 2A–F illustrate various methods for easily defeating the prior art spare tire locking device of FIG. 1.
Figure 2B:
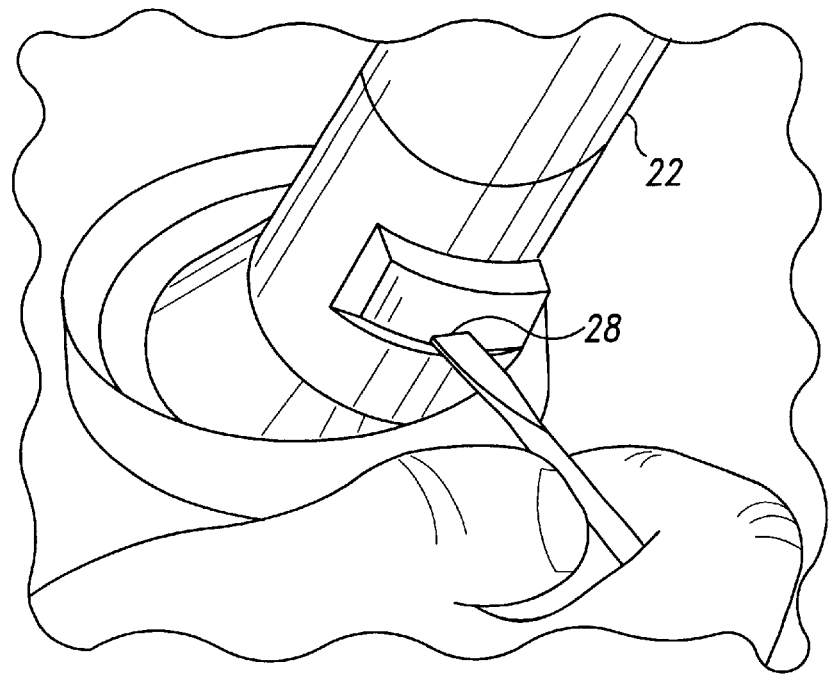
Figure 2C:
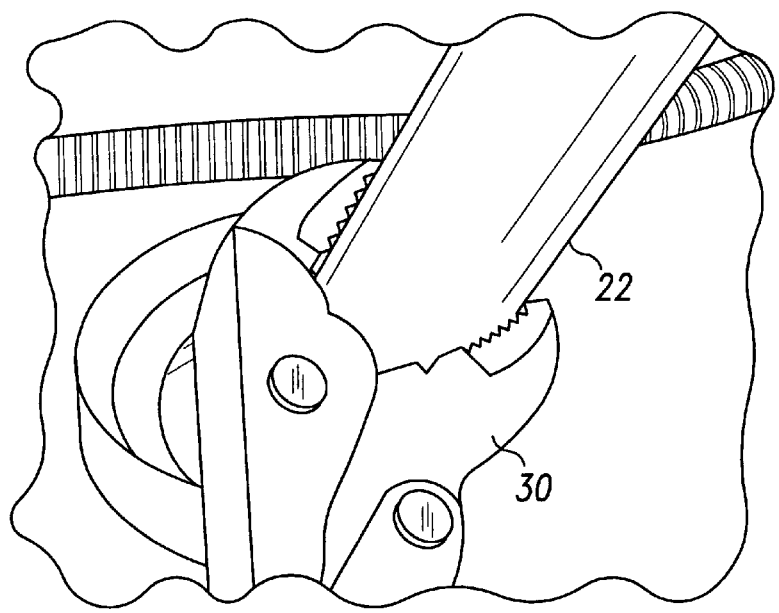
Figure 2D:
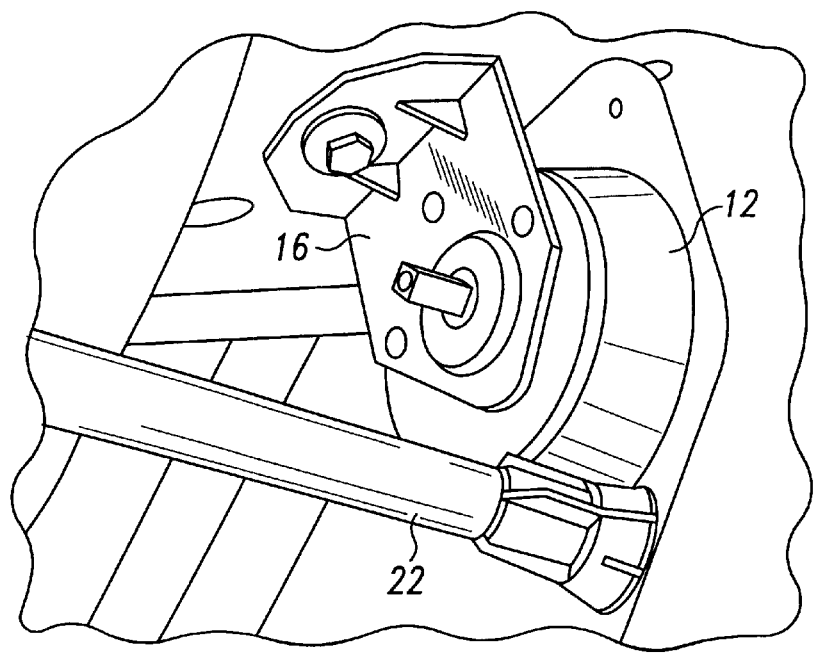
Figure 2E:
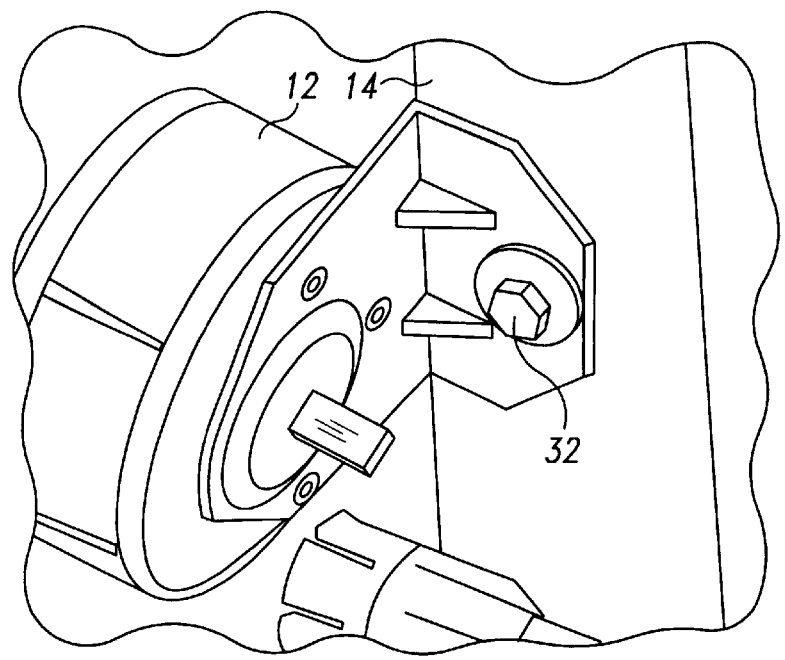
Figure 2F:
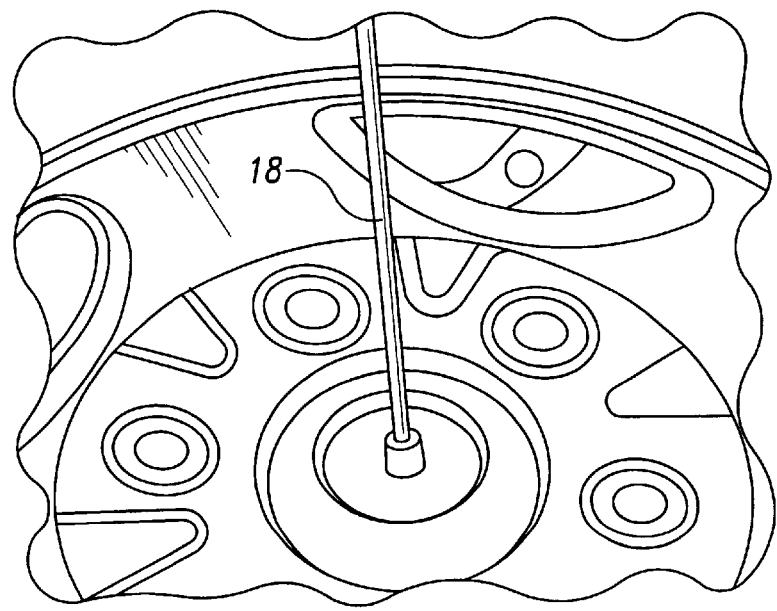

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 3:
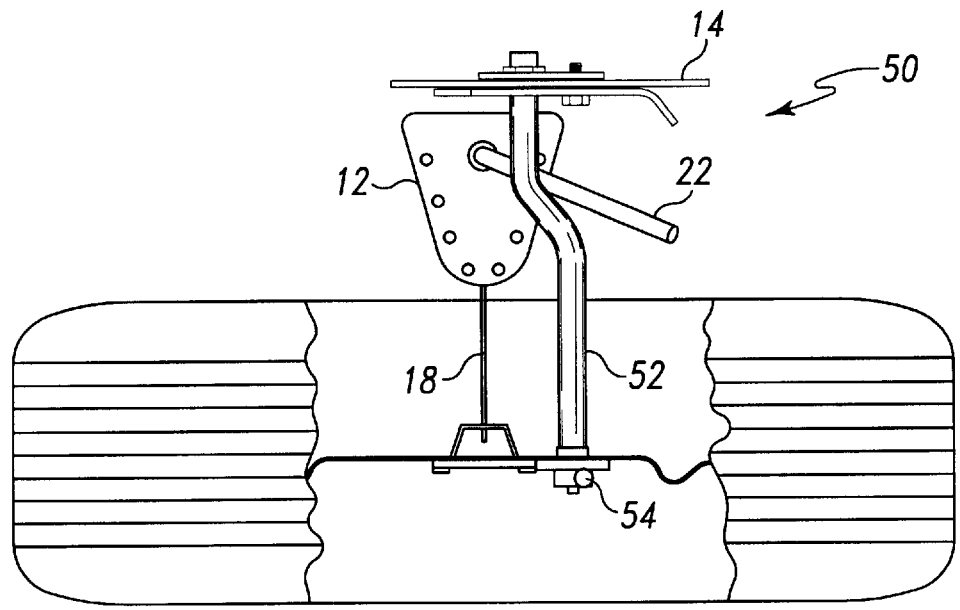
FIG. 3 is a side elevational view of a preferred embodiment spare tire lock according to the present invention, mounted to a vehicle frame and the vehicle spare tire.

In order to overcome the deficiencies discussed hereinabove with respect to prior art spare tire locking mechanisms, the present invention comprises the improved spare tire lock illustrated in FIG. 3 and indicated generally at 50. The spare tire lock 50 includes a locking bar 52 which attaches to the frame of the vehicle and extends through one of the lug nut holes in the spare wheel. The lock bar 52 incorporates a double bend so that the lock bar 52 can be rotated during installation in order to bring the distal end thereof into alignment with the lug nut holes of various different wheel configurations. The double bend additionally facilitates installation of the lock bar 52 from above the frame cross-member (as described hereinbelow) without removing the spare wheel. A locking mechanism 54 is then placed on the end of the locking bar 52 in order to prevent the spare wheel from being removed from the locking bar 52 without the proper key. Because the locking bar 52 is attached to, and supported by, the vehicle frame 14, disabling the manufacturer-installed winch lock will not allow removal of the spare wheel and tire. Furthermore, as described more fully hereinbelow, the spare tire lock 50 of the present invention has many features which prevent it from being defeated by a would-be thief.

Figure 4:
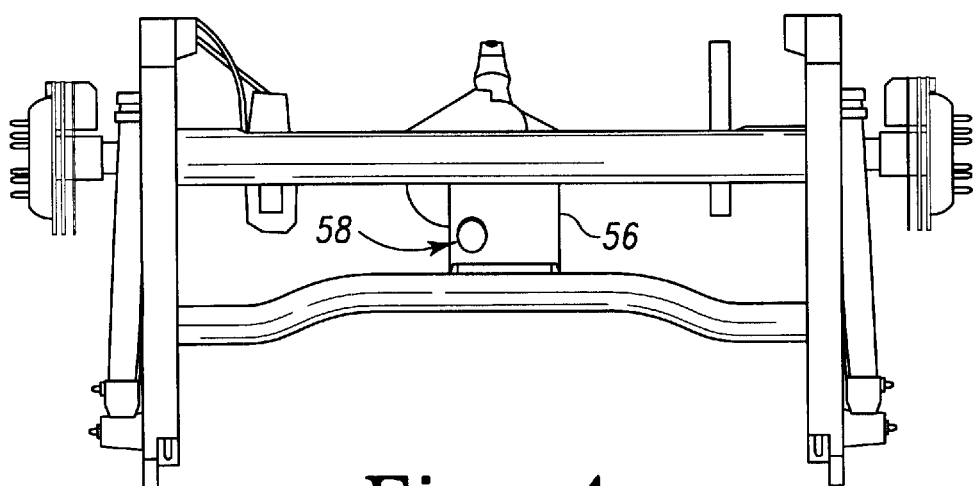
FIG. 4 is a perspective view of a prior art vehicle frame.

With reference to FIG. 4, there is shown the rear portion of the vehicle frame for a 1999 CHEVROLET SILVERADO pick-up truck. In the center of the frame is a panel 56 that is welded between two frame cross members. A hole 58 is formed completely through the panel 56 in order to locate the panel during the assembly weld operation during vehicle manufacture. The winch 12 is coupled to the underside of the panel 56. The hole 58 is useful for mounting the lock bar 52 of the present invention to the pick-up truck. However, the spare tire lock of the present invention may be coupled to other vehicles which do not include such a hole 58, by drilling a custom hole, by welding, by gluing, by clamping, or by any other suitable means. The 1999 CHEVROLET SILVERADO application is illustrated herein solely for purposes of illustration.

Figure 5:
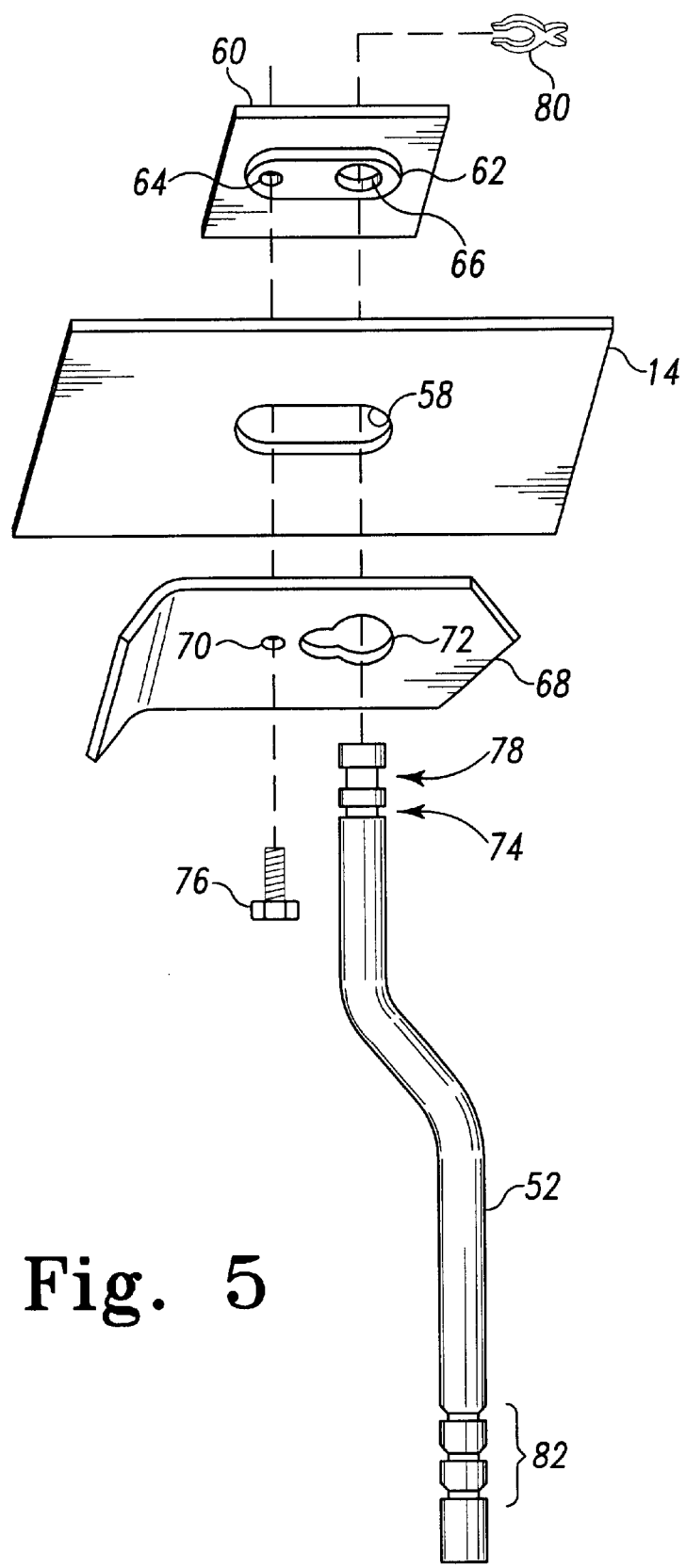
FIG. 5 is an exploded perspective view of a locking bar of the present invention and preferred embodiment mounting means for attaching the locking bar to the vehicle frame.
Figure 6:
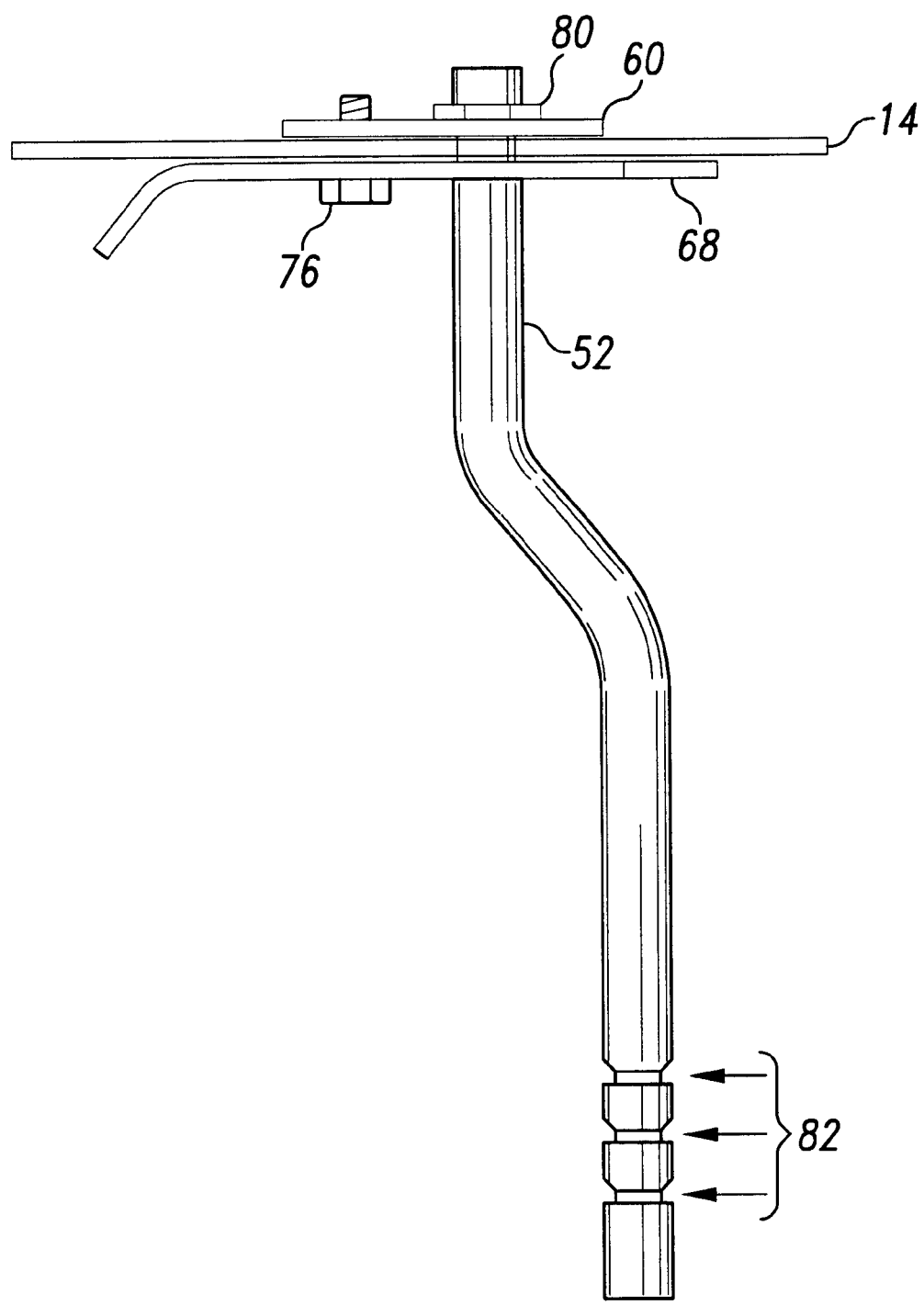
FIG. 6 is a side elevational view of the locking bar and mounting means of FIG. 5 in an assembled configuration.

The details of a preferred embodiment mounting method for attaching the lock bar 52 to the frame 14 is illustrated in an exploded view in FIG. 5 and in an assembled view in FIG. 6. A top brace 60, preferably having a raised island 62 formed on one side thereof, wherein the island 62 is sized and shaped so as to fit snugly within the hole 58, is placed on the upper side of the frame member 14. The top brace 60 has a first threaded hole 64 and a second hole 66 drilled therethrough. The diameter of the second hole 66 is large enough to permit the lock bar 62 to extend therethrough. A bottom brace member 68 is placed underneath the hole 58 on the bottom side of the frame 14. The bottom brace 68 has a first hole 70 formed therethrough, such that the hole 70 aligns with the hole 64. A second hole 72 is formed in the bottom brace 68, the second hole 72 being formed in a keyhole shape. The lock bar 52 includes a first necked-down section 74 which has a smaller diameter than the main diameter of the lock bar 52. The hole 72 is formed such that the larger side thereof will allow passage of the main diameter of the lock bar 52, while the smaller diameter thereof will allow passage of only the necked-down section 74.

The upper (or proximal) end of the lock bar 52 is inserted through the larger diameter of the hole 72, through the hole 58 and through the hole 66 until the necked-down portion 74 is aligned with the hole 72. The bottom brace 68 is then slid sideways so as to engage the smaller diameter portion of hole 72 with the necked-down portion 74. This operation aligns the hole 70 with the hole 64, allowing a bolt 76 to be screwed therethrough. The lock bar 52 has a second necked-down portion 78 formed therein, where the necked-down portion 78 extends past the top brace 60 after the assembly is put together. A retaining clip 80, which is inserted over the necked-down portion 78 prior to inserting the lock bar 52 through the hole 58, prevents the lock bar 52 from being drawn downward, even if the bottom brace 68 is removed. In this manner, the lock bar 62 may be securely mounted to the frame 14, making it difficult, if not impossible for a thief to remove the lock bar 52 from the frame 14.

With reference once again to FIG. 3, it can be seen that once the lock bar 52 is coupled to the frame 14, it extends down to a level where the spare wheel and tire may be mounted thereto by extending the lower (or distal) end of the lock bar 52 through one of the lug nut holes (or any other opening) in the spare wheel. As described in greater detail hereinbelow, the locking mechanism 54 may then be attached to the distal end of the lock bar 52 by interference with one of the necked-down portions 82 near the distal end of the lock bar 52. The bottom brace 68, which is formed from a sturdy metal, prevents the spare tire lock of the present invention from being defeated by a hard blow to the distal end of the lock bar in an attempt to break the mounting to the frame 14.

Figure 7:
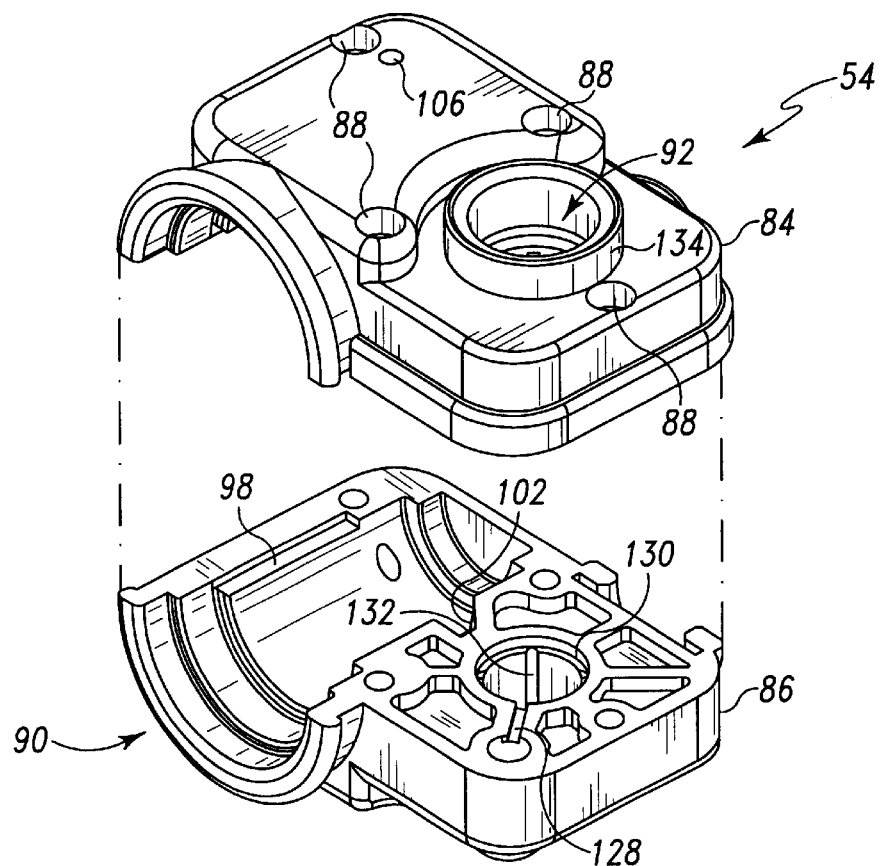
FIG. 7 is a top exploded perspective view of a preferred embodiment locking mechanism housing of the present invention.
Figure 8:
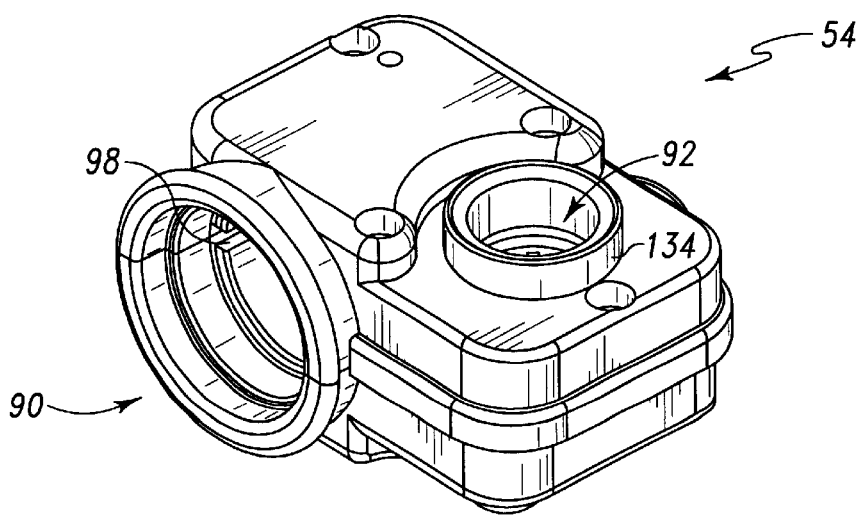
FIG. 8 is a first top perspective view of the preferred embodiment locking mechanism housing of the present invention.
Figure 9:
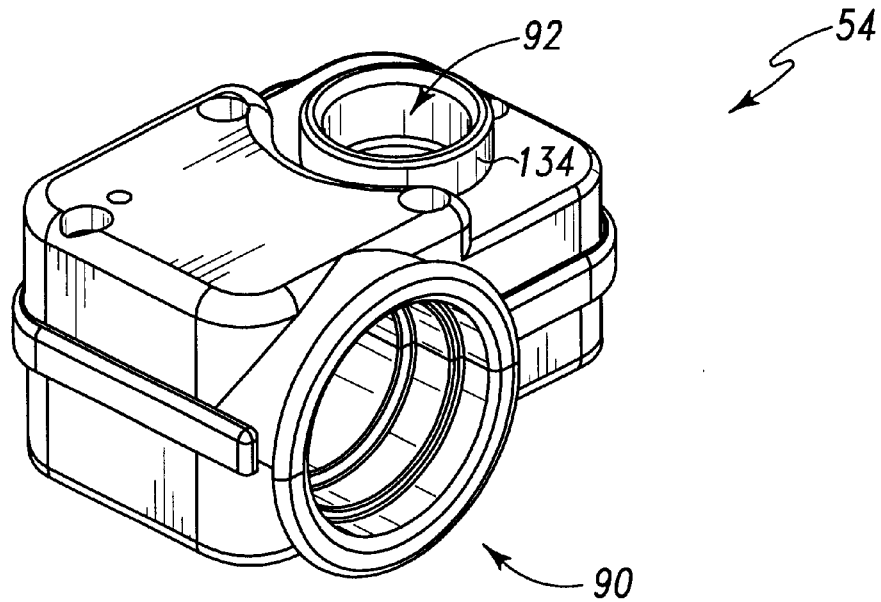
FIG. 9 is a second top perspective view of the preferred embodiment locking mechanism housing of the present invention.
Figure 10:
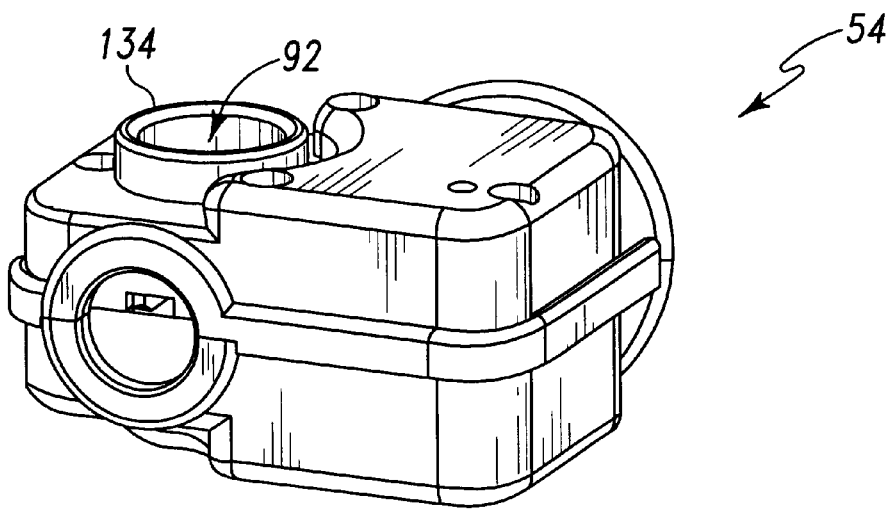
FIG. 10 is a third top perspective view of the preferred embodiment locking mechanism housing of the present invention.

Referring to FIG. 7, there is illustrated a preferred embodiment housing for the locking mechanism 54, shown in an exploded view. The assembled housing is shown in various top perspective views in FIGS. 8–10. The locking mechanism 54 consists of an upper housing half 84 and a lower housing half 86. In a preferred embodiment, the housing halves 84 and 86 are glued together and then screwed and/or riveted together at multiple locations 88. The tops of the fasteners inserted into the holes 88 are positioned toward the vehicle frame when the locking mechanism 54 is installed onto the lock bar 52. This insures that the screws in the holes 88 may not be removed by a would-be thief in an attempt to defeat the locking mechanism 54.

Once assembled, the lock mechanism 54 defines a cavity 90 for insertion of a lock cylinder, and a passage 92 for insertion of a lock bar 52. The locking mechanism 54 is illustrated in a bottom perspective exploded view in FIG. 11, as well as in two assembled bottom perspective views in FIGS. 12 and 13.

Figure 15:
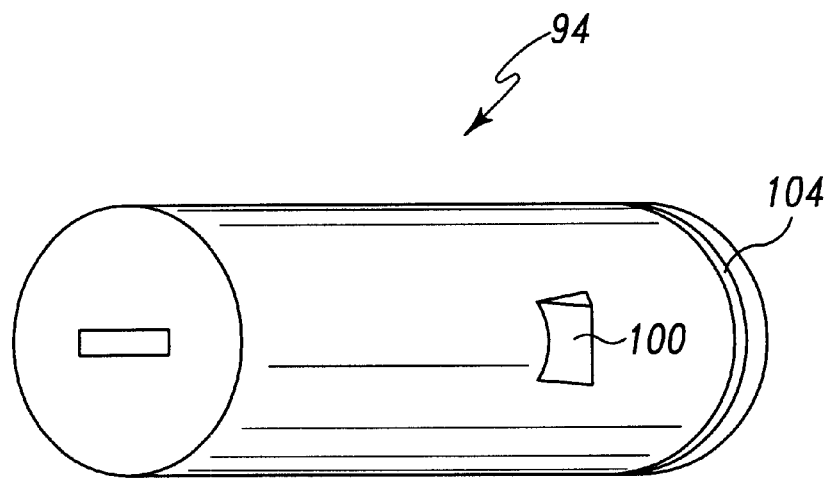
FIG. 15 is a first side perspective view of the preferred embodiment lock cylinder of the present invention.
Figure 16:
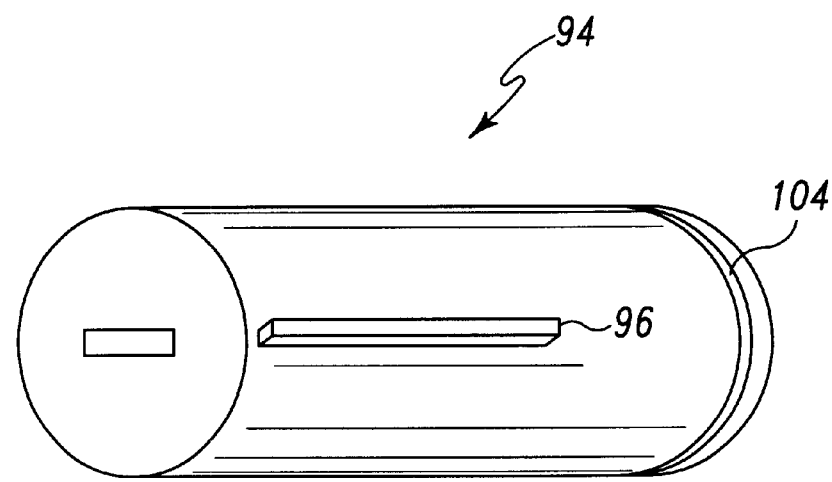
FIG. 16 is a second side perspective view of the preferred embodiment lock cylinder of the present invention.

The locking mechanism 54 includes the cavity 90 for accepting a lock cylinder, such as the lock cylinder 94 illustrated in FIGS. 15 and 16. The lock cylinder 94 has a raised ridge key 96 extending along one side thereof, the key 96 dimensioned to fit within a keyway 98 formed within the cavity 90. Interaction of the key 96 with the keyway 98 insures that the lock 94 cam pin 100 is positioned to extend into the slot 102 formed into the side of the lock cylinder cavity 90. The cam pin 100 is designed to retract within the lock cylinder 94 when the lock cylinder 94 is unlocked, and to be locked in an extended position away from the lock cylinder 94 when the lock cylinder 94 is locked. Therefore, when the lock cylinder 94 is locked, interaction between the cam pin 100 and the slot 102 prevents the lock cylinder 94 from being removed from the locking mechanism 54.

In many instances, the winch tube 22 supplied by the vehicle manufacturer will include a removable lock cylinder 94. The locking mechanism 54 of the present invention is designed to accept such a lock cylinder 94 provided by the vehicle manufacturer. It is only necessary to unlock the manufacturer's lock cylinder 94, remove it from the winch tube 22 and insert it into the cavity 90 of the locking mechanism 54 of the present invention. Preferably, the manufacturer's O-ring will be removed from the groove 104 on the circumference of the lock cylinder 94 prior to insertion into the cavity 90. The upper locking mechanism housing 84 includes a hole 106 positioned to align with the groove 104 in the lock cylinder 94. Once the lock cylinder 94 has been inserted into the cavity 90, a spring pin (not shown) may be driven into the hole 106 such that it extends into the groove 104. The spring pin will therefore permanently retain the lock cylinder 94 into the cavity 90, even when the lock cylinder 94 is in the unlocked position. The ability of the locking mechanism 54 of the present invention to accept the lock cylinder provided by the vehicle manufacturer in its own spare tire locking device is a significant advantage, in that the manufacturer's lock cylinder 94 will be keyed to match the remaining locks on the vehicle. This therefore allows the spare tire lock of the present invention to be operated with the same key used for the other locks on the vehicle, thereby eliminating any need for the vehicle operator to carry a separate key to use with the present invention.

Figure 14:
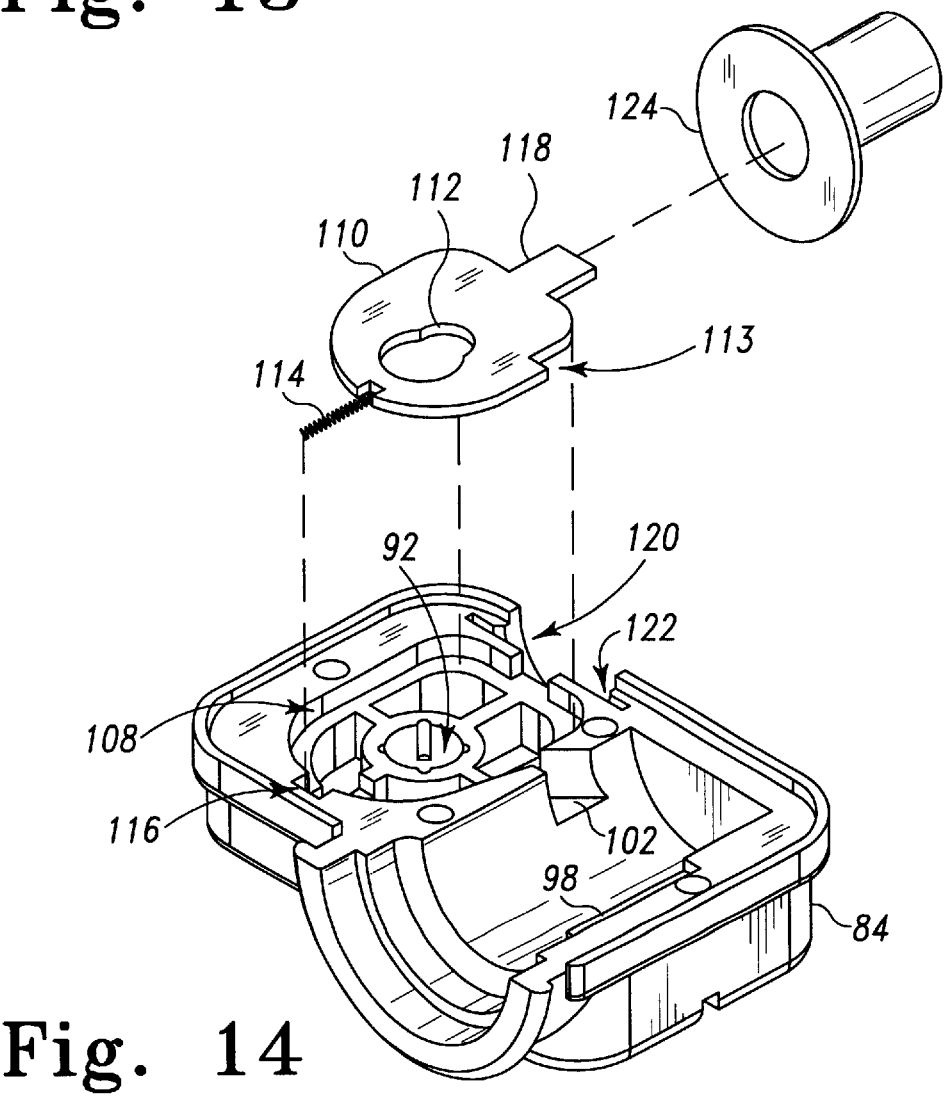
FIG. 14 is an exploded perspective view of the bottom half of the locking mechanism housing, illustrating the locking bar retaining mechanism contained therein.

As best illustrated in FIG. 14, the top housing half 84 includes a recessed area 108 surrounding the passage 92 that receives the lock bar 52. The recess 108 is preferably 0.135 inches deep in order to accept a 0.125 inch thick metal plate 110. The plate 110 includes a central, elongated hole 112 therethrough, through which the lock bar 52 passes. The hole 112 has a first end having a first diameter and a second end having a second diameter. When the lock cylinder 94 is in the locked position, the cam pin 100 extends through the slot 102 and engages the plate 110 at the notch 113. This causes the smaller diameter side of the hole 112 to interact with one of several necked-down sections 82 of the lock bar 52, thereby preventing the lock bar 52 from being withdrawn from the locking mechanism 54. Several of the necked-down sections 82 are provided on the lock bar 52 in order to provide an adjustable length to the spare tire lock 50. This provides advantages as described hereinbelow.

A spring 114 is placed between the plate 110 and a recess 116 provided in the housing 84 for this purpose. Pressure from spring 114 causes the moveable plate 110 to move to a position where the large diameter side of the hole 112 maintains a negative contact with the necked-down section 82 of the lock bar 52, thereby preventing the smaller diameter of hole 112 from engaging the necked-down section of the lock bar, when the lock cylinder 94 remains in the unlocked position. The moveable plate 110 further includes an extended tab end 118, which protrudes from the housing 84 through opening 120. Depressing tab end 118 back through opening 120 against the pressure of spring 114, after the lock cylinder 94 is returned to the locked position, will allow the spring actuated lock cylinder cam pin to engage the notched out edge 113 of the moveable plate and smaller diameter hole 112 to maintain a positive contact with the necked-down section 82 of the lock bar 52, thereby preventing the locking mechanism 54 from being forcefully removed from the lock bar 52, until the lock cylinder 94 is unlocked, which retracts the lock cylinder cam pin away from the notched-out edge 113 of the moveable plate, allowing spring pressure to return the moveable plate to a negative contact position with the lock bar 52, thereby aligning cavity 92 of the lock mechanism 54 with the large diameter hole of the moveable plate 100, allowing removal of lock mechanism 54 from lock bar 52.

In order to provide a weather tight seal, the housing halves 84 and 86 include a circumferential annular recess 122, into which is placed the rim edge of the "top hat" shaped elastic sealing device 124. Depressing the end of the top hat seal 124 allows an operator to push the extended tab end 118 of the moveable plate 110 back into the recessed cavity 108, to a locked position.

Figure 11:
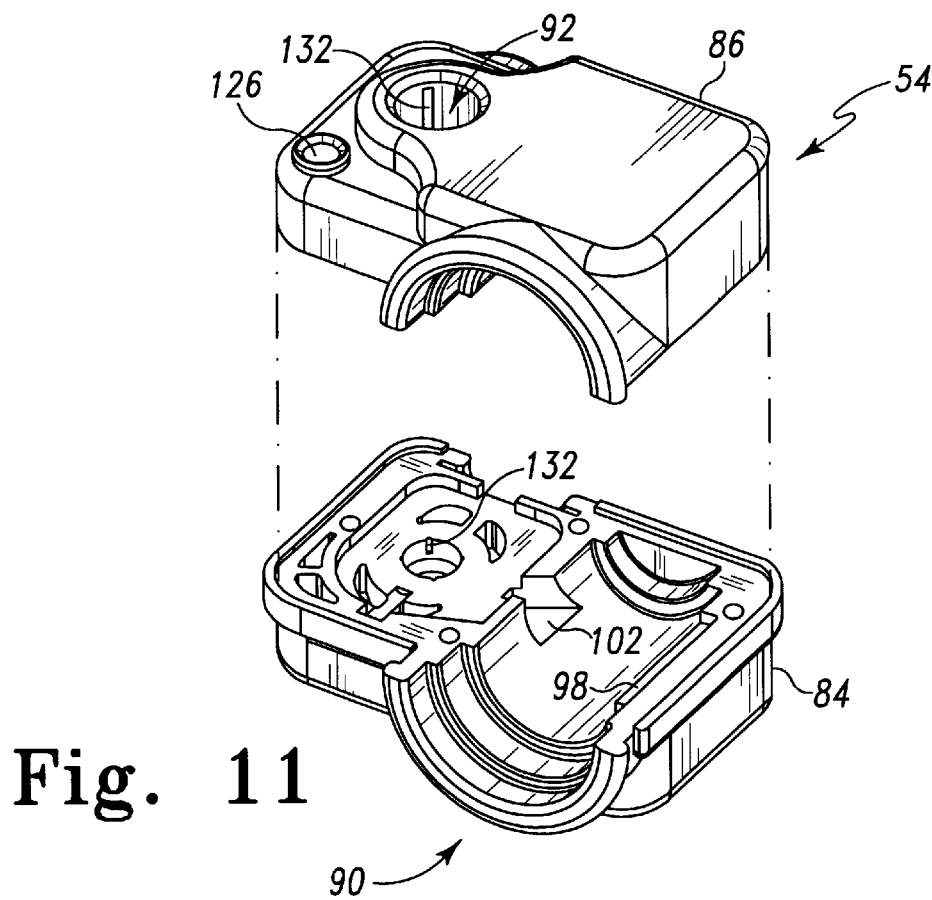
FIG. 11 is an exploded bottom perspective view of the preferred embodiment locking mechanism housing of the present invention.
Figure 12:
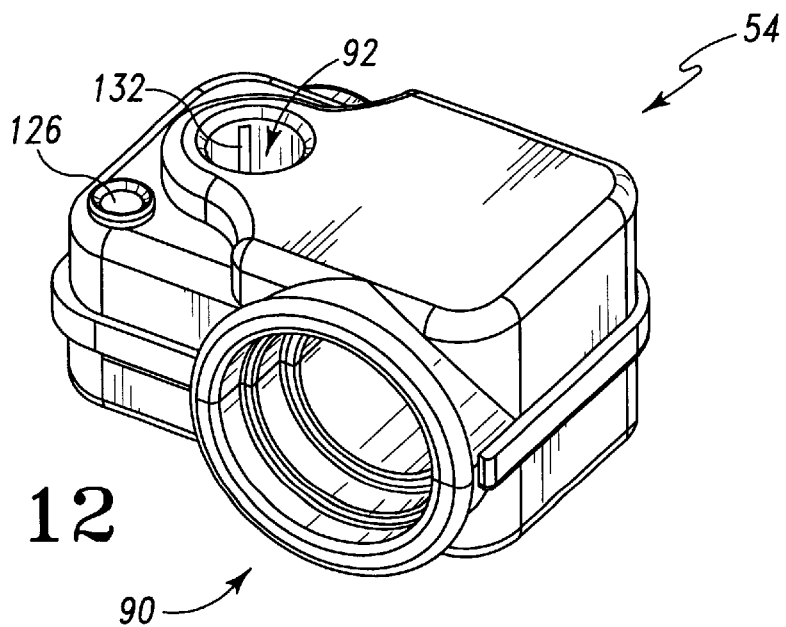
FIG. 12 is a first bottom perspective view of the preferred embodiment locking mechanism housing of the present invention.
Figure 13:
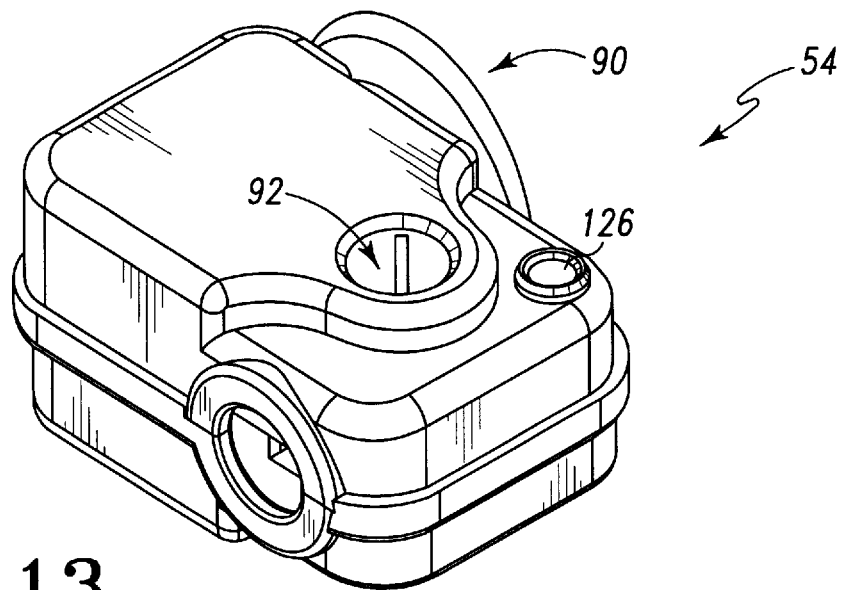
FIG. 13 is a second bottom perspective view of the preferred embodiment locking mechanism housing of the present invention.

With reference now to FIGS. 11–13, there is included on the bottom half of housing 86 a grease fitting 126 which allows grease to be injected vertically into cavity 92. An alternate design location would place the grease fitting 126 on the front side of the locking mechanism adjacent to the lock cylinder cavity opening, centered between housing 84 and housing 86, allowing grease to be injected horizontally into cavity 92. The outlet of the grease fitting 126 communicates with a channel 128 formed in the lower housing half 86 (see FIG. 7).

The channel 128 allows grease to flow into a counter bore 130 formed around the passage 192, and from there into four equally spaced splines 132 which run longitudinally along the inner surface of the shaft 92. The flow of grease through these passages allows a thorough coating of the lock bar 52 for anti-corrosion purposes.

Figure 17:
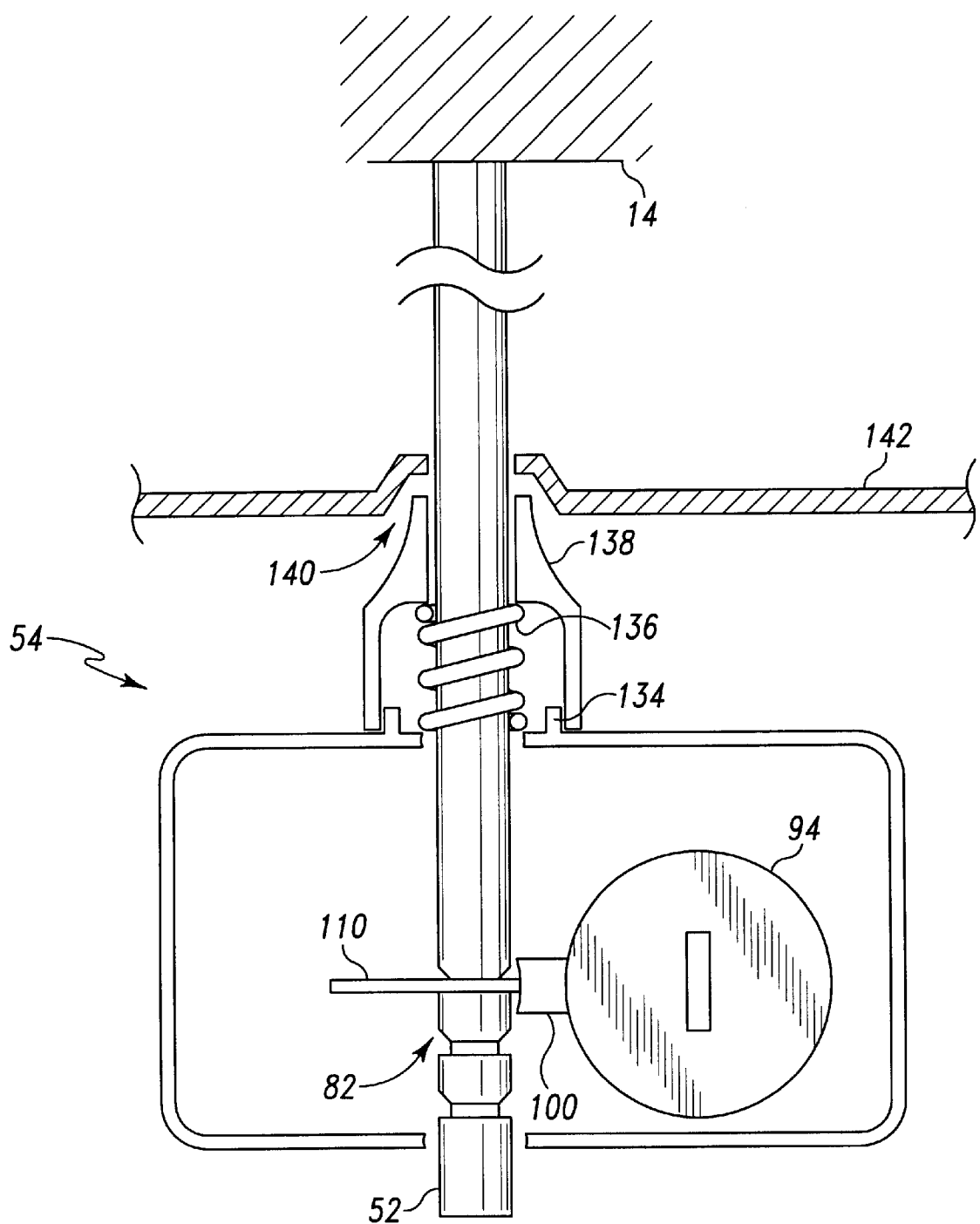
FIG. 17 is a side, partial cross-sectional view of the preferred embodiment locking mechanism mounted upon the locking bar of the present invention, illustrating the resilient connection between the present invention and the spare wheel.

With reference again to FIG. 7, the upper housing half 84 includes a raised round boss 134 formed thereon which includes an internal counterbore surface. As shown in FIG. 17, a spring 136, preferably a one-inch compression spring, sits within the counterbore within the boss 134. The internal diameter of the spring 136 is large enough to pass the lock bar 52 therethrough. An elastic boot, such as the rubber boot 138, is attached to the exterior of the boss 134 by means of a friction fit. The boot 138 has an opening large enough to pass the lock bar 52 therethrough. The top surface of the boot 38 is also tapered, such that the tapered section of the boot 138 will fit into a tapered lug nut hole 140 of a spare wheel 142. The tapered section of the boot 138 fills the space between the lock bar 52 and the spare wheel 142 to prevent a possible rattling condition. Furthermore, the compressible nature of the boot 138 and the compression spring 136 allows for looser tolerances in the grooves 82 of the lock bar 52, which accept the plate 110 held in position by the lock cam pin 100, while still maintaining a tight fit between the boot 138 and the spare wheel 142 lug hole inside diameter.

In a preferred embodiment, the two housing halves 84 and 86 are die-cast from Zmac3 (a zinc alloy), using a prior art Dynacast four-slide process. Forming the housing for the locking mechanism 54 as a two-piece clam shell design is preferred in order to have access to the inside of the housing for assembly.

Figure 18:
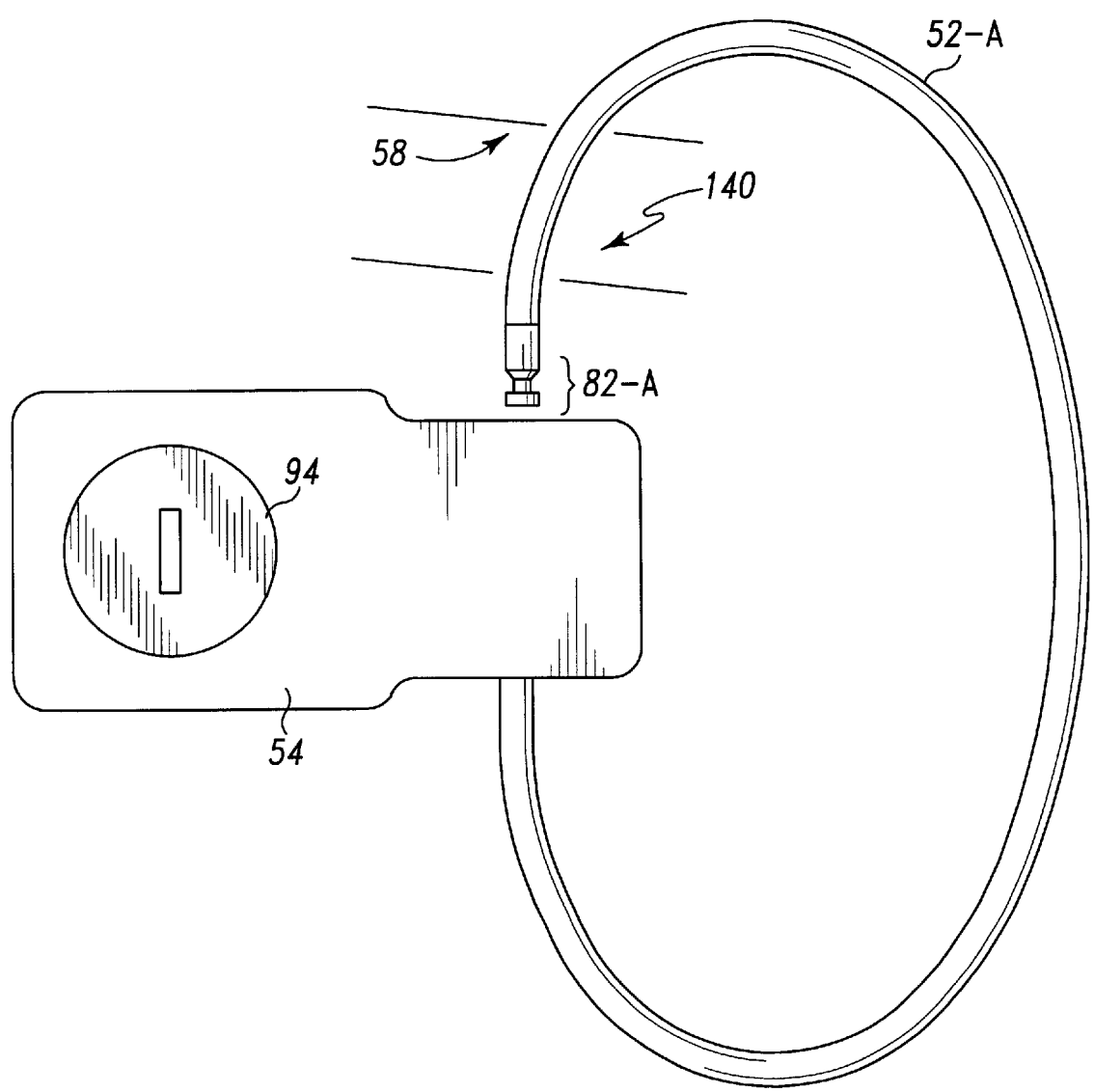
FIG. 18 is a side elevational view of a second embodiment of the present invention.

An alternative embodiment of the present invention is illustrated in FIG. 18. In this alternative embodiment, the lock bar 52 is replaced by a flexible cable version 52-A, such as a plastic-coated, braided steel cable. One end of the cable 52-A is permanently attached to the locking mechanism 54, such as by means of a screw driven into the end of the lock bar 52-A expanding the cable end, preventing removal back through hole 58. The lock bar 52-A may then be threaded through the hole 58 in the vehicle frame and the wheel lug nut hole 140, whereupon the locking mechanism 54 may be engaged upon the necked-down section of cable end 82-A.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A spare tire lock for securing a spare wheel and tire suspended under a vehicle having a frame, said spare tire lock comprising:

a lock bar having a proximal end and a distal end, the lock bar proximal end being coupled to said vehicle frame, wherein said lock bar extends down through an opening in said spare wheel, such that the proximal and distal ends of said lock bar are on opposite sides of said spare wheel; and a locking mechanism releasably coupled to the distal end of said lock bar.

2. The spare tire lock of claim 1, wherein said lock bar has a main diameter, a first-necked down diameter in a region adjacent the proximal end, and a second necked-down diameter between the first necked-down diameter and the distal end.

3. The spare tire lock of claim 2, further comprising a mount for coupling said lock bar to said frame, said mount comprising:

a top brace having a first hole formed therethrough, the first hole being sized to allow the proximal end of said lock bar to pass therethrough;

a bottom brace having a second keyhole-shaped hole formed therethrough, the second hole having a first section having a first diameter larger than the main diameter of said lock bar, and having a second section having a second diameter larger than the second necked-down diameter and smaller than the main diameter of said lock bar; and a retaining clip sized to engage the first necked-down diameter of said lock bar;

wherein said lock bar proximal end is mounted to said frame by engaging said retaining clip to the first necked-down diameter, placing said top brace above a hole in said frame, placing said bottom brace below the hole in said frame such that the first hole is substantially aligned with the first section of the second hole, sliding said lock bar through said first and second holes until the second necked-down diameter is aligned with said bottom brace, and sliding said bottom brace until the second section of the second hole engages the second necked-down diameter.

4. The spare tire lock of claim 1, wherein:
said lock bar includes at least one necked-down section adjacent the distal end; and
said locking mechanism comprises:
 a housing having a first passage formed therethrough, the first passage sized to accept said lock bar;
 a moveable plate contained within said housing; and
 a lock cylinder located in said housing, said lock cylinder having a cam pin wherein said cam pin is operative to keep said moveable plate engaged with the necked-down section of said lock bar when said lock cylinder is in a locked state.

5. The spare tire lock of claim 4, further comprising:
an elastic boot having a first end coupled to said housing around an opening of the first passage, a tapered second end, and a second passage formed through said boot between the first and second ends; and
a compression spring located in said second passage and operative to resist collapsing of said elastic boot;
wherein said elastic boot and said compression spring take up any excessive space between said locking mechanism and said spare wheel when said locking mechanism is coupled to the distal end of said lock bar.

6. The spare tire lock of claim 4, wherein said housing further comprises:
a first cavity formed in said housing;
a grease fitting positioned within said first cavity, said grease fitting having an inlet for accepting grease from an external source and an outlet for expelling the grease; and
an internal groove formed in said housing and having a first end in fluid communication with the fitting outlet and a second end in fluid communication with the first passage;
wherein grease injected into the grease fitting inlet is transmitted through said groove and to said lock bar residing in the first passage.

7. The spare tire lock of claim 6, further comprising at least one longitudinal spline groove formed on an interior surface of the first passage and in fluid communication with said groove.

8. A method of locking a spare wheel and tire suspended under a vehicle having a frame, a pre-existing winch for raising and lowering the spare wheel, and a pre-existing lock for locking the pre-existing winch, comprising the steps of:
 a) providing a lock bar having a proximal end and a distal end;
 b) coupling the lock bar proximal end to the frame;
 c) removing a lock cylinder from the pre-existing lock;
 d) extending the distal end of the lock bar through an opening in the spare wheel, such that the proximal and distal ends of the lock bar are on opposite sides of the spare wheel;
 e) providing a locking mechanism housing having a cavity therein for accepting a locking lock cylinder;
 f) inserting the lock cylinder from the pre-existing lock into the cavity in the locking mechanism housing;
 g) lockingly coupling the locking mechanism to the distal end of the lock bar.

9. The method of claim 8, wherein said lock bar has a main diameter, a first-necked down diameter in a region adjacent the proximal end, and a second necked-down diameter between the first necked-down diameter and the distal end.

10. The method of claim 9, wherein step (b) further comprises:
 b.1) providing a top brace having a first hole formed therethrough, the first hole being sized to allow the proximal end of said lock bar to pass therethrough;
 b.2) providing a bottom brace having a second keyhole-shaped hole formed therethrough, the second hole having a first section having a first diameter larger than the main diameter of said lock bar, and having a second section having a second diameter larger than the second necked-down diameter and smaller than the main diameter of said lock bar;
 b.3) providing a retaining clip sized to engage the first necked-down diameter of said lock bar;
 b.4) placing the top brace above a hole in the frame;
 b.5) placing the bottom brace below the hole in the frame such that the first hole is substantially aligned with the first section of the second hole;
 b.6) sliding the lock bar through the first and second holes until the second necked-down diameter is aligned with the bottom brace;
 b.7) sliding the bottom brace until the second section of the second hole is engaging the second necked-down diameter; and
 b.8) engaging the retaining clip to the first necked-down diameter.

11. A spare tire lock for securing a spare wheel and tire suspended under a vehicle having a frame, said spare tire lock comprising:
 a lock bar having a proximal end and a distal end, the lock bar proximal end being coupled to said vehicle frame, wherein said lock bar extends down through an opening in said spare wheel, such that the proximal and distal ends of said lock bar are on opposite sides of said spare wheel; and
 a locking mechanism lockingly coupled to the distal end of said lock bar.

12. The spare tire lock of claim 11, wherein said lock bar has a main diameter, a first-necked down diameter in a region adjacent the proximal end, and a second necked-down diameter between the first necked-down diameter and the distal end.

13. The spare tire lock of claim 12, further comprising a mount for coupling said lock bar to said frame, said mount comprising:
 a top brace having a first hole formed therethrough, the first hole being sized to allow the proximal end of said lock bar to pass therethrough;
 a bottom brace having a second keyhole-shaped hole formed therethrough, the second hole having a first section having a first diameter larger than the main diameter of said lock bar, and having a second section having a second diameter larger than the second necked-down diameter and smaller than the main diameter of said lock bar; and
 a retaining clip sized to engage the first necked-down diameter of said lock bar;

wherein said lock bar proximal end is mounted to said frame by engaging said retaining clip to the first necked-down diameter, placing said top brace above a hole in said frame, placing said bottom brace below the hole in said frame such that the first hole is substantially aligned with the first section of the second hole, sliding said lock bar through said first and second holes until the second necked-down diameter is aligned with said bottom brace, and sliding said bottom brace until the second section of the second hole engages the second necked-down diameter.

14. The spare tire lock of claim 11, wherein:

said lock bar includes at least one necked-down section adjacent the distal end; and said locking mechanism comprises:
   a housing having a first passage formed therethrough, the first passage sized to accept said lock bar;
   a moveable plate contained within said housing; and
   a lock cylinder located in said housing, said lock cylinder having a cam pin wherein said cam pin is operative to keep said moveable plate engaged with the necked-down section of said lock bar when said lock cylinder is in a locked state.

15. The spare tire lock of claim 14, further comprising:

an elastic boot having a first end coupled to said housing around an opening of the first passage, a tapered second end, and a second passage formed through said boot between the first and second ends; and a compression spring located in said second passage and operative to resist collapsing of said elastic boot;

wherein said elastic boot and said compression spring take up any excessive space between said locking mechanism and said spare wheel when said locking mechanism is coupled to the distal end of said lock bar.

16. The spare tire lock of claim 14, wherein said housing further comprises:

a first cavity formed in said housing;

a grease fitting positioned within said first cavity, said grease fitting having an inlet for accepting grease from an external source and an outlet for expelling the grease; and an internal groove formed in said housing and having a first end in fluid communication with the fitting outlet and a second end in fluid communication with the first passage;

wherein grease injected into the grease fitting inlet is transmitted through said groove and to said lock bar residing in the first passage.

17. The spare tire lock of claim 16, further comprising at least one longitudinal spline groove formed on an interior surface of the first passage and in fluid communication with said groove.

* * * * *